United States Patent
Kim (10) Patent No.: US 12,115,903 B2
(45) Date of Patent: Oct. 15, 2024

(54) DETECTING STROKE OF A BRAKE PEDAL OUTPUT A CONTROL SIGNAL TO THE BRAKE LAMPS

(71) Applicants: Hyundai Motor Company, Seoul (KR); Kia Corporation, Seoul (KR)

(72) Inventor: Eun Sik Kim, Gwangmyeong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 106 days.

(21) Appl. No.: 17/743,084

(22) Filed: May 12, 2022

(65) Prior Publication Data

US 2023/0009011 A1 Jan. 12, 2023

(30) Foreign Application Priority Data

Jul. 8, 2021 (KR) ........................ 10-2021-0089965

(51) Int. Cl.
*B60Q 1/44* (2006.01)
*B60T 1/10* (2006.01)
*B60T 13/58* (2006.01)

(52) U.S. Cl.
CPC ............... *B60Q 1/444* (2013.01); *B60T 1/10* (2013.01); *B60T 13/586* (2013.01); *B60T 2270/604* (2013.01)

(58) Field of Classification Search
CPC .......... B60Q 1/441; B60Q 1/444; B60T 1/10; B60T 13/586; B60T 17/22; B60T 2270/604; F16D 61/00
See application file for complete search history.

(56) References Cited

U.S. PATENT DOCUMENTS

| | | | |
|---|---|---|---|
| 11,485,330 B1* | 11/2022 | Kulkarni | B60D 1/06 |
| 2007/0279207 A1* | 12/2007 | Clark | B60Q 1/441 |
| | | | 340/479 |
| 2016/0129896 A1* | 5/2016 | Tu | B60T 8/1708 |
| | | | 701/70 |
| 2020/0039425 A1* | 2/2020 | Shimada | B60Q 1/44 |
| 2021/0070293 A1* | 3/2021 | Arai | B60W 10/188 |
| 2022/0105925 A1* | 4/2022 | Naserian | B60L 7/18 |

FOREIGN PATENT DOCUMENTS

KR 101807068 B1 12/2017
KR 10-2022-0060242 A 5/2022

* cited by examiner

*Primary Examiner* — Omer S Khan
(74) *Attorney, Agent, or Firm* — Morgan, Lewis & Bockius LLP (57) ABSTRACT

A brake system includes a stroke detector configured to detect a stroke of a brake pedal and to output a signal; a first controller configured to generate ON/OFF signals for a brake lamp based on the signal from the stroke detector; and a second controller including a switch configured to receive the ON/OFF signals and control ON/OFF of the brake lamp, in which the first controller and the switch are directly connected to each other.

7 Claims, 4 Drawing Sheets

DETECTING STROKE OF A BRAKE PEDAL OUTPUT A CONTROL SIGNAL TO THE BRAKE LAMPS

CROSS REFERENCE TO RELATED APPLICATION

The present application claims priority to Korean Patent Application No. 10-2021-0089965, filed Jul. 8, 2021, the entire contents of which is incorporated herein for all purposes by this reference.

BACKGROUND OF THE PRESENT DISCLOSURE

Field of the Present Disclosure

The present disclosure relates to a brake system that reduces a cost by removing an existing brake pedal-based brake lamp switch by generating ON/OFF signals using input/output signals depending on whether a vehicle is decelerated, that prevents non-turning-on of a brake lamp due to breakage or malfunction of an MUC included in an Integrated Central Control Unit (ICU) controlling turning-ON/OFF of the brake lamp, and that secures safety of a vehicle and users.

Description of Related Art

A vehicle is decelerated by a braking device such as a brake which is manually operated, for example, by a pedal. Such a brake is provided with a stroke detector which is provided on the hinge shaft of the pedal and detects the rotation angle of the pedal. In addition to the stroke detector, the brake may be provided with a brake lamp switch for generating ON/OFF signals to inform the user, and drivers or pedestrians around the vehicle of whether the pedal is operated. These two peripheral devices of the brake are usually connected to an ICU including an MCU and a switch that controls the brake lamp through hardware, that is, a wiring, inputting/outputting signals.

However, the brake lamp switch of the peripheral devices of a brake is a hardware switch which is separately mounted on a vehicle. Accordingly, the present increases a cost of a vehicle. Furthermore, an existing brake system transmits a signal to an ICU that controls the operation of a brake lamp in response to the operation of a brake pedal through a brake lamp switch. Accordingly, the existing system employs a technology of facilitating a brake lamp switch to transmit by itself a control signal to a switch included in an ICU when the MCU included in the ICU breaks or abnormally operates.

However, the existing system cannot turn on a brake lamp when an MCU breaks or abnormally operates and a braking device independent from a brake lamp switch is operated like in a situation in which regenerative braking is performed or a self-driving assistant system is operated.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a brake system that reduces a cost by removing an existing brake pedal-based brake lamp switch by generating ON/OFF signals using input/output signals depending on whether a vehicle is decelerated, that prevents non-turning-on of a brake lamp due to breakage or malfunction of an MUC included in an Integrated Central Control Unit (ICU) controlling turning-ON/OFF of the brake lamp, and that secures safety of a vehicle and users.

A brake system according to an aspect of the present disclosure includes: a stroke detector configured to detect a stroke of a brake pedal and to output a signal; a first controller configured to generate ON/OFF signals for a brake lamp according to a result of comparing the signal from the stroke detector with a predetermined reference value; and a second controller including a switch configured to receive the ON/OFF signals and control ON/OFF of the brake lamp, in which the first controller and the switch are directly connected to each other.

The first controller may include a braking controller configured to control a brake device provided on a wheel of a vehicle, and the braking controller may be directly connected to the switch.

The first controller may further include a regenerative braking controller and the regenerative braking controller may be directly connected to the switch.

The first controller may include a pedal controller disposed in an electronic brake pedal and a braking controller configured to control a brake device provided on a wheel of a vehicle, the pedal controller may transmit the signal from the stroke detector to the braking controller, the braking controller may be configured to generate ON/OFF signals based on the signal transmitted from the stroke detector, and the braking controller may be directly connected to the switch.

The first controller may include a pedal controller disposed in an electronic brake pedal, and the pedal controller may be configured to generate ON/OFF signals and may be directly connected to the switch.

The signal from the stroke detector may include a first channel signal of which duty linearly decreases from a maximum duty to a minimum duty when the stroke of the brake pedal increases and a second channel signal of which duty linearly increases from the minimum duty to the maximum duty when the stroke of the brake pedal increases; and the first channel signal and the second channel signal may have a mutually complementary relationship with 50% duty therebetween.

The predetermined reference value may include a first reference value and a second reference value that have a mutually complementary relationship with 50% duty therebetween; the first controller may be configured to generate first ON/OFF signals that transit into a low state from a high state according to a result of comparing the first channel signal and the first reference value with each other, and may generate second ON/OFF signals that transit into the high state from the low state according to a result of comparing the second channel signal and the second reference value with each other; and the ON/OFF signals may correspond to the first ON/OFF signals or the second ON/OFF signals.

A brake system according to another aspect of the present disclosure includes: a stroke detector configured to detect a stroke of a brake pedal and output a first detection signal; a self-driving controller configured to output a second detection signal for giving an instruction of deceleration by determining whether a vehicle is decelerated while being driven; a first controller configured to generate ON/OFF signals for a brake lamp according to the first detection signal and the second detection signal; and a second controller including a switch configured to receive the ON/OFF signals and control ON/OFF of the brake lamp, in which the first controller and the switch are directly connected to each other.

The first controller may include a braking controller configured to control a brake device provided on a wheel of a vehicle, and the braking controller may be directly connected to the switch.

The first controller may further include a regenerative braking controller and the regenerative braking controller may be directly connected to the switch.

The first controller may include a pedal controller disposed in an electronic brake pedal and a braking controller configured to control a brake device provided on a wheel of a vehicle, the pedal controller may transmit the first detection signal from the stroke detector to the braking controller, the braking controller may be configured to generate ON/OFF signals based on the first detection signal transmitted from the stroke detector, and the braking controller may be directly connected to the switch.

The first controller may include a pedal controller disposed in an electronic brake pedal, and the pedal controller may be configured to generate ON/OFF signals and may be directly connected to the switch.

The first detection signal from the stroke detector or the second detection signal from the self-driving controller may include a first channel signal of which duty linearly decreases from a maximum duty to a minimum duty when the stroke of the brake pedal or braking power required by the self-driving controller increases and a second channel signal of which duty linearly increases from the minimum duty to the maximum duty when the stroke of the brake pedal or braking power required by the self-driving controller increases; and the first channel signal and the second channel signal may have a mutually complementary relationship with 50% duty therebetween.

The predetermined reference value may include a first reference value and a second reference value that have a mutually complementary relationship with 50% duty therebetween; the first controller may be configured to generate first ON/OFF signals that transit into a low state from a high state according to a result of comparing the first channel signal and the first reference value with each other, and may generate second ON/OFF signals that transit into the high state from the low state according to a result of comparing the second channel signal and the second reference value with each other; and the ON/OFF signals may correspond to the first ON/OFF signals or the second ON/OFF signals.

A brake system according to another aspect of the present disclosure includes: a stroke detector configured to detect a stroke of a brake pedal and to output a signal; a braking controller configured to generate ON/OFF signals for a brake lamp according to a result of comparing the signal from the stroke detector with a predetermined reference value; a pedal controller disposed in an electronic brake pedal, connected to the braking controller through Control unit Area Network (CAN), and configured to generate ON/OFF signals for a brake lamp according to a result of comparing the signal from the stroke detector disposed in the electronic brake pedal with a predetermined reference value; and an ICU including a switch configured to receive the ON/OFF signals and control ON/OFF of the brake lamp, in which at least one of the braking controller and the pedal controller is directly connected to the switch.

According to a brake system, a cost is reduced by removing an existing brake pedal-based brake lamp switch by generating ON/OFF signals using input/output signals depending on whether a vehicle is decelerated, non-turning-on of a brake lamp due to breakage or malfunction of an MUC included in an Integrated Central Control Unit (ICU) controlling turning-ON/OFF of the brake lamp when a brake pedal is operated is prevented, and safety of a vehicle and users is secured.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it may be understood that the present disclosure may be variously embodied, without being limited to the exemplary embodiments of the present disclosure. Hereinafter, various exemplary embodiments of the present disclosure will be described in detail with reference to the accompanying drawings.

Figure 1:
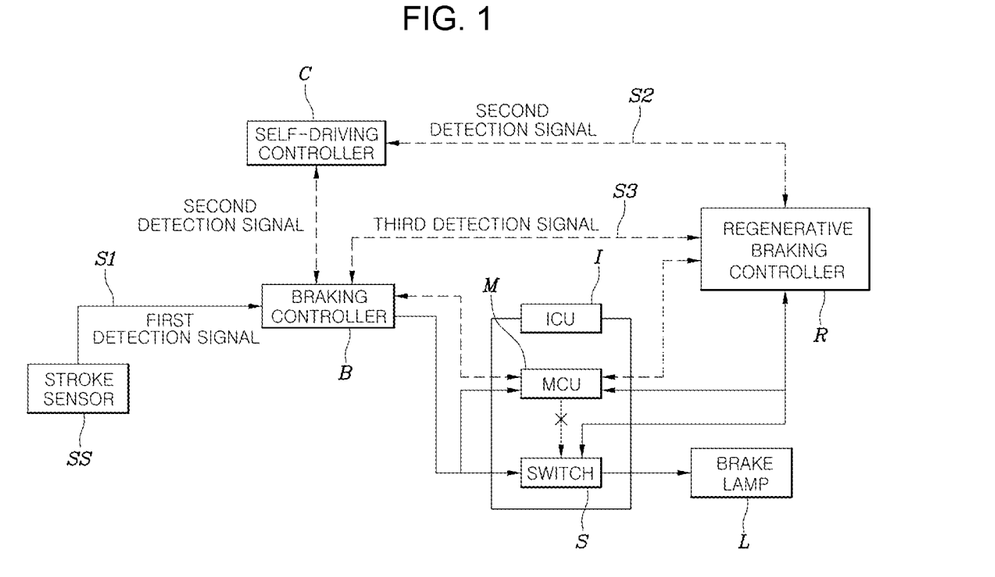
FIG. 1 is a diagram showing the configuration of a brake system according to various exemplary embodiments of the present disclosure.
Figure 2:
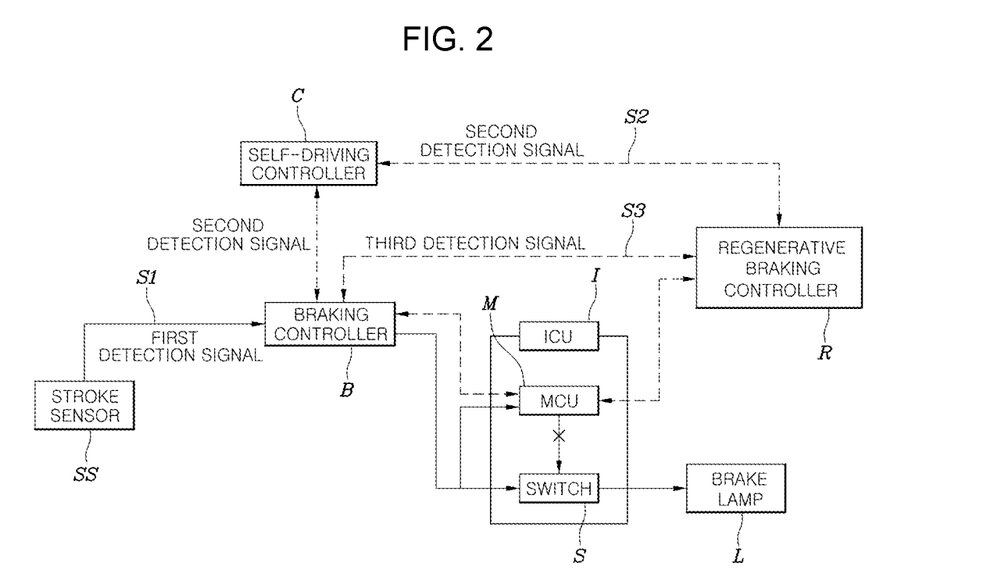
FIG. 2 is a diagram showing the configuration of a brake system according to various exemplary embodiments of the present disclosure.
Figure 3:
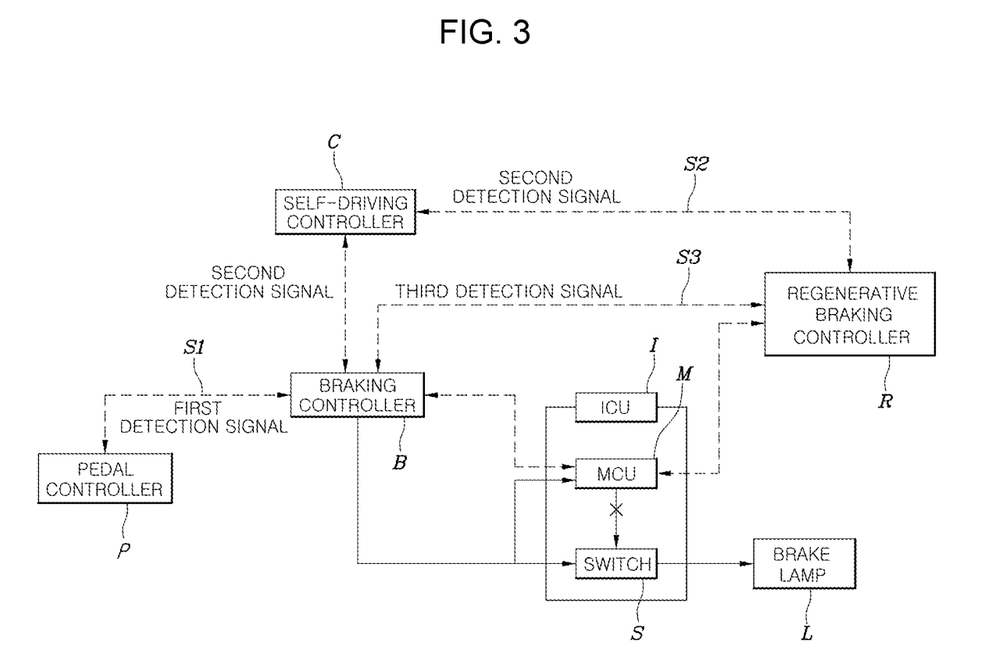
FIG. 3 is a diagram showing the configuration of a brake system including a pedal controller according to various exemplary embodiments of the present disclosure.
Figure 4:
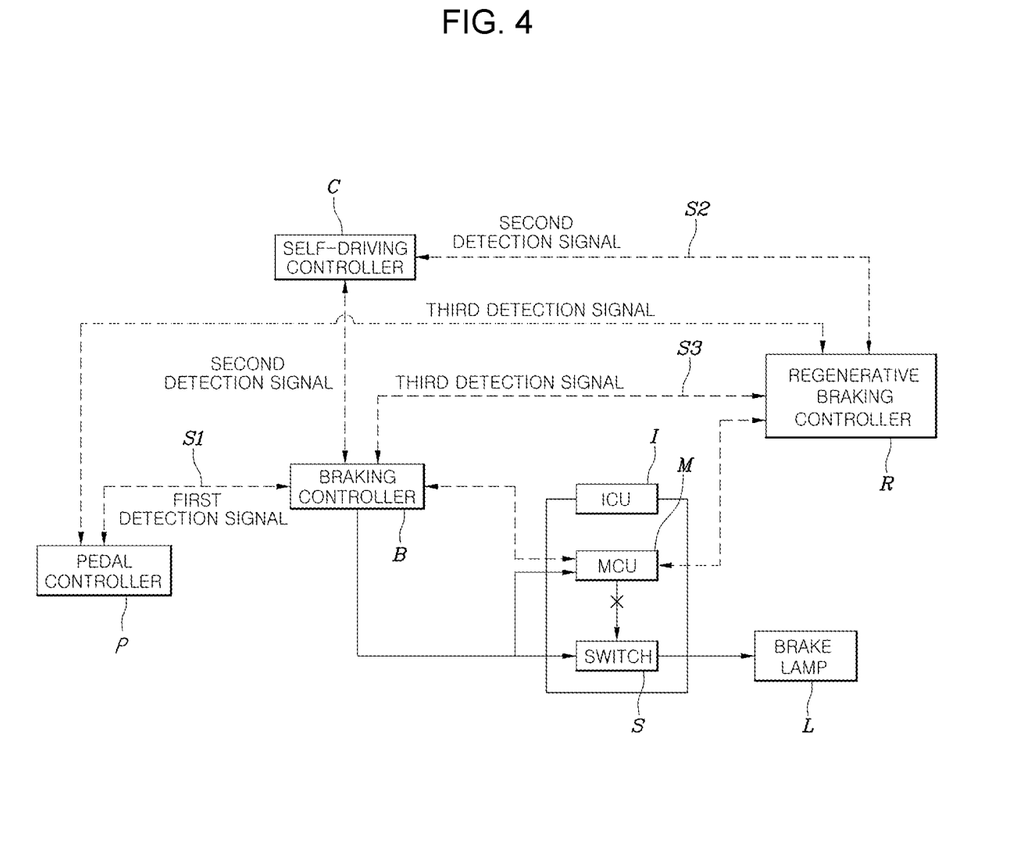
FIG. 4 is a diagram showing the configuration of a brake system including a pedal controller according to various exemplary embodiments of the present disclosure.
Figure 5:
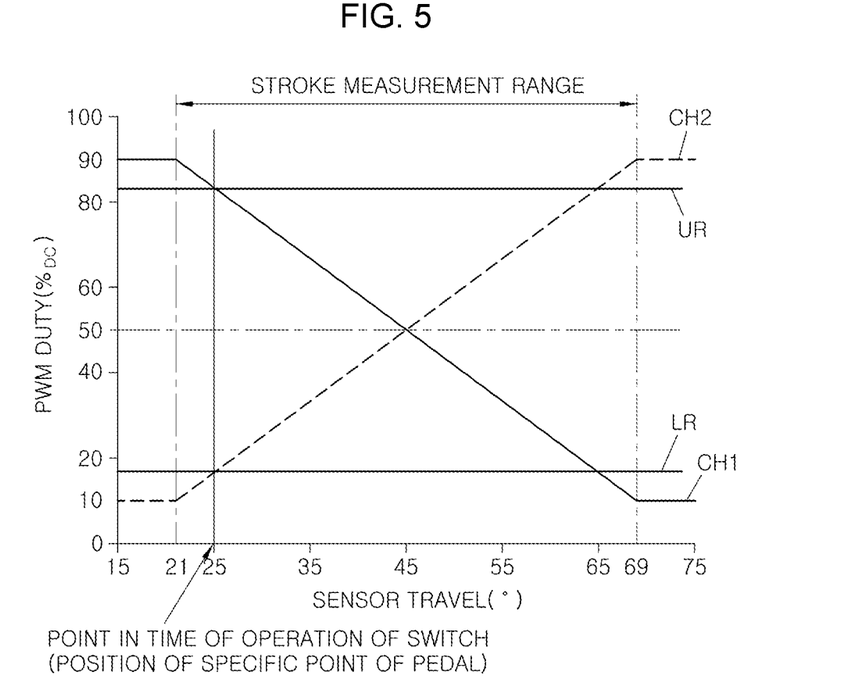
FIG. 5 and FIG. 6 are diagrams showing other examples of ON/OFF signals that are generated by a brake system according to an exemplary embodiment of the present disclosure.
Figure 6:
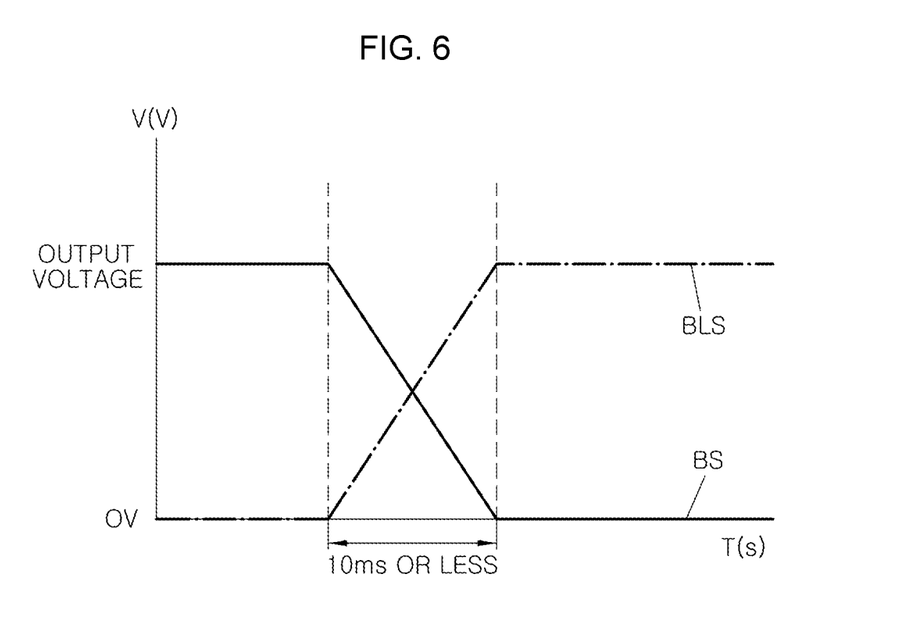

FIG. 1 is a diagram showing the configuration of a brake system according to an exemplary embodiment of the present disclosure, FIG. 2 is a diagram showing the configuration of a brake system according to another exemplary embodiment of the present disclosure, FIG. 3 and FIG. 4 are diagrams showing the configuration of brake systems including a pedal controller according to an exemplary embodiment of the present disclosure, and FIG. 5 and FIG. 6 are diagrams showing other examples of ON/OFF signals that are generated by a brake system according to an exemplary embodiment of the present disclosure.

First Exemplary Embodiment: ON/OFF Signal Generation System of Braking Controller & Regenerative Braking Controller FIG. 1 is a diagram showing the configuration of a brake system according to an exemplary embodiment of the present disclosure. As shown in FIG. 1, a brake system according to an exemplary embodiment of the present disclosure includes: a stroke detector SS; a self-driving controller C; a first controller including a braking controller B and a regenerative braking controller R; and a second controller such as an ICU I including a switch W such as an IPS (Intelligent Power Switch), in which the first controller and the switch S may be directly connected to each other.

As for the components of the brake system shown in FIG. 1, the stroke detector SS detects a stroke of a brake pedal and outputs a first detection signal S1; the self-driving controller C determines whether a vehicle is decelerated and outputs a second detection signal S2 in self-driving; the first controller includes the braking controller B that determines whether to operate brake devices provided on the wheels of a vehicle in based on whether the stroke detector detects a stroke and the determination on whether a vehicle is decelerated by the self-driving controller, or the regenerative braking controller R that determines whether to operate a motor in a vehicle for regenerative braking based on whether the stroke detector detects a stroke and the determination on whether a vehicle is decelerated by the self-driving controller; and a switch S turns ON/OFF a brake lamp L of a vehicle in response to ON/OFF signals.

The control process of the brake system according to various exemplary embodiments shown in FIG. 1 is described in more detail. The stroke detector SS detects a stroke of a brake pedal and outputs a first detection signal S1 to the braking controller B. The braking controller B can transmit the first detection signal S1 to the regenerative braking controller R. That is, the regenerative braking controller R can receive a first detection signal S1 of the stroke detector SS which depends on a stroke, that is, displacement or an angle of a brake pedal, whether the pedal is operated, etc. from the braking controller B regardless of the brake lamp switch.

The self-driving controller C shown in FIG. 1 determines whether a vehicle is decelerated and then outputs a second detection signal S2 to the braking controller B or the regenerative braking controller R. The braking controller B and the regenerative braking controller R that receive the first detection signal S1 or the second detection signal S2 transmit and receive a third detection signal S3 about whether the detection signal is received, being able to distribute the entire requested braking power of a vehicle therebetween or charge the power to any one thereof.

An important entity is that the first controller including the braking controller B and the regenerative braking controller R is directly connected to the switch W in the brake system shown in FIG. 1. The term 'direct connection' means that when the braking controller B included in the first controller is configured to determine that the brake devices provided on the wheels of a vehicle are operated or the regenerative braking controller included in the first controller is configured to determine that regenerative braking is performed, ON/OFF signals may be generated and directly provided to the switch even not through the MCU M included in the second controller. The ON/OFF signals depending on operation of the brake pedal may be generated based on the result of comparing a detection signal including the first detection signal S1 or the second detection signal S2 with a predetermined reference value by the first controller including the braking controller B and the regenerative braking controller R.

As a result, the braking controller B or the regenerative braking controller R shown in FIG. 1 generates ON/OFF signals based on the result of comparing a detection signal including the first detection signal S1 or the second detection signal S2 (the third detection signal S3, depending on situations, the same below) with a predetermined reference value. As an example of a conversion method, a switch-on signal may be generated when the output of a detection signal becomes higher than the predetermined reference value while the detection signal rises, and a switch-off signal may be generated when the output of the detection signal becomes lower than the predetermined reference value while the detection signal drops. ON/OFF signals generated in the instant way are provided to the switch S, whereby the brake lamp L may be finally controlled. Accordingly, in the brake system according to an exemplary embodiment of the present disclosure, because the braking controller B and the regenerative braking controller R each transmit ON/OFF signals even in a braking condition in which the brake pedal is not operated, responsiveness of the switch may be increased.

Meanwhile, the self-driving of a vehicle described herein includes self-driving which is achieved by a system which is a self-driving assistant system over level 2 and assists forward collision avoidance, lane keeping, lane following, smart cruise control, highway driving, etc. of a vehicle when a driver does not operate the brake pedal. The regenerative braking controller R may be a Vehicle Control Unit (VCU) or a hybrid Control Unit (HCU) and regenerative braking of a vehicle may be performed by an order from the regenerative braking controller.

In FIG. 1, the solid lines show a direction connection type and the dotted lines show a Control unit Area Network (CAN) connection type. That is, the first detection signal S1 may be provided to the first controller by a wiring connection type, and the second detection signal S2 or the third detection signal S3 may be provided to the first controller by the CAN connection type. According to the direction connection type, the first controller is connected to the switch S of the second controller through wiring and can receive ON/OFF signals. Unlike the switch S, the MCU M can transmit/receive signals in the CAN connection type.

In other words, according to the exemplary embodiment of the present disclosure, signals are transmitted/received among the devices through wiring or CAN connection, and the first controller, the MCU M, and the switch S, the braking controller B and the regenerative braking controller R included in the first controller and the switch S are directly connected through wiring. CAN communication gives a priority to a message for a corresponding device using a message-oriented protocol, and detects error in a mutually complementary type. Since signals are transmitted through the wiring a continuous hardware type, the signals should be converted into ON/OFF signals and then the ON/OFF signals should be transmitted to the switch S. Accordingly, the ON/OFF signals may be generated based on comparing the first detection signal S1 or the second detection signal S2 with the predetermined reference value. For example, when the switch S is an IPS, the switch can generate an ON/OFF-on signal when it increases from a level under the predetermined reference value, and can generate an ON/OFF-off signal when it decreases from a level over the predetermined reference value.

Accordingly, in an exemplary embodiment of the present disclosure, because the stroke detector SS is connected to the first controller through wiring, and the first controller and the switch S are directly connected to each other, preventing the possibility of delay through a communication server such as CAN and a server. Furthermore, according to the exemplary embodiment of the present disclosure, the possibility of stop due to paralysis of a CAN communication device, etc. is prevented. Accordingly, control according to the environment of a vehicle becomes accurate, and efficiency and convenience of driving according to driver's intention are increased. Therefore, according to the brake system of an exemplary embodiment of the present disclosure, wired and wireless communication types are selectively applied, in accordance with devices, whereby convenience for a driver is increased and quick and accurate automatic control is provided.

Second Exemplary Embodiment: ON/OFF Signal Generation System Based on Only Braking Controller A control process of a brake system according to the various exemplary embodiments shown in FIG. 2 is described in detail through comparison with the first exemplary embodiment of the present disclosure. In another exemplary embodiment of the present disclosure, similar to FIG. 1, the stroke detector SS, the self-driving controller C, and the regenerative braking controller R each detect a stroke of the brake pedal, or output first, second, and third signals S1, S2, and S3 to the braking controller B when a self-driving assistant system is activated or regenerative braking is determined. However, in another exemplary embodiment of the present disclosure, the regenerative braking controller does not generate ON/OFF signals and is not directly connected to the switch. Only the braking controller B generates ON/OFF signals and is directly connected to the switch.

The braking controller B shown in FIG. 2 independently generates ON/OFF signals based on the result of comparing a direction signal with a predetermined reference value. That is, not a specific brake lamp switch, but the braking controller B converts continuous analog signals provided through wiring of a vehicle into ON/OFF signals. The conversion method is the method of generating ON/OFF signals by comparing a detection signal with a predetermined reference value when the detection signal rises/drops, as described with reference to FIG. 1. ON/OFF signals generated in the instant way are provided to the switch S, whereby the brake lamp L is controlled. Accordingly, compared with the various exemplary embodiments shown in FIG. 1, according to the brake system of the various exemplary embodiments shown in FIG. 2, only the braking controller B that substantially the most frequently performs braking transmits ON/OFF signals to the switch, whereby the wiring of a vehicle is simplified, and thus, productivity and price competitiveness are increased.

Third Exemplary Embodiment: ON/OFF Signal Generation System Based on CAN Signal Transmission of Pedal Controller FIG. 3 is a diagram showing the configuration of a brake system including a pedal controller according to various exemplary embodiments of the present disclosure. The various exemplary embodiments includes: a stroke detector that detects a stroke of a brake pedal and outputs a signal; a braking controller that generates ON/OFF signals for a brake lamp based on the result of comparing a signal from the stroke detector with a predetermined reference value; a pedal controller which is disposed in an electronic brake pedal and is connected to the braking controller through CAN; and an ICU that includes a switch receiving ON/OFF signals and controlling ON/OFF of a brake lamp, in which at least one of the braking controller and the pedal controller may be directly connected to the switch.

The pedal controller P, which is provided in an electronic brake pedal together with a device that can perform CAN communication, detects a stroke of the brake pedal, generates a CAN signal based on the result of sensing pedal operation by the stroke detector in the electronic brake pedal, and transmits the CAN signal to the braking controller B. The braking controller B independently generates ON/OFF signals based on the result of comparing the CAN signal from the pedal controller P with a predetermined reference value. That is, not a specific brake lamp switch, but the braking controller B generates ON/OFF signals based on the CAN signals from the pedal controller P. ON/OFF signals generated in the instant way are provided to the switch S, whereby the brake lamp L is controlled. Therefore, according to the brake system of the exemplary embodiment shown in FIG. 3, only the braking controller B that substantially the most frequency performs braking transmits ON/OFF signals to the switch based on the CAN signal from the pedal controller, whereby the wiring of a vehicle is simplified, and thus, productivity and price competitiveness are increased.

Fourth Exemplary Embodiment: ON/OFF Signal Generation System of Pedal Controller FIG. 4 shows a brake system including a pedal controller P according to various exemplary embodiments of the present disclosure. In the various exemplary embodiments of the present disclosure, the pedal controller P generates ON/OFF signals for the brake lamp L based on the result of comparing a signal from the stroke detector SS disposed in an electronic brake pedal with a predetermined reference value. The pedal controller may be directly connected to the switch S. That is, in the various exemplary embodiments of the present disclosure, the pedal controller P can also perform the function of the braking controller B.

The pedal controller P shown in FIG. 4 generates ON/OFF signals based on the result of comparing a detection signal including the first detection signal S1 and the third detection signal S3 with a predetermined reference value. The first detection signal S1 is a CAN communication-based signal that the stroke detector SS disposed in an electronic brake pedal transmits to the braking controller B when detecting a stroke of the brake pedal. The third detection signal is a CAN communication-based signal that the regenerative braking controller R can output to the pedal controller P. ON/OFF signals generated in the instant way are provided to the switch S, whereby the brake lamp L may be finally controlled. Therefore, according to the brake system of the various exemplary embodiments of the present disclosure, since the pedal-based pedal controller P that performs braking first when the brake pedal is operated transmits ON/OFF signals by itself, the responsiveness of the switch may be further increased. In the various exemplary embodiments in which ON/OFF signals are generated by the pedal controller P, since a braking signal is transmitted directly to the switch not through the braking controller when the brake pedal is operated, responsiveness is highest.

FIG. 5 is a diagram showing an example of a detection signal which is output from the stroke detector SS or the self-driving controller C. The detection signal includes a first channel signal CH1 of which the duty linearly decreases from the maximum duty to the minimum duty when the stroke of the brake pedal increases or braking power required while a vehicle is driving increases, and a second channel signal CH2 of which the duty linearly increases from the minimum duty to the maximum duty in the same situation.

The first channel signal CH1 and the second channel signal CH2 may have a mutually complementary relationship with 50% duty therebetween.

The predetermined reference value in FIG. 6 includes a first reference value and a second reference value that have a mutually complementary relationship with 50% duty therebetween. The braking controller B or the regenerative braking controller R generate first ON/OFF signals, which transit into a low state from a high state, based on the result of comparing the first channel signal CH1 and the first reference value UR, and generate second ON/OFF signals, which transit into a high state from a lower state, based on the result of comparing the second channel signal with the second reference value. ON/OFF signals may be the first ON/OFF signals or second ON/OFF signals.

As shown in FIG. 5, in the brake system according to an exemplary embodiment of the present disclosure, the stroke detector SS or the self-driving controller C can output a first channel signal CH1 which is one signal of which the duty linearly decreases from the maximum duty (90% duty in FIG. 5) to the minimum duty (10% duty in FIG. 5) when the displacement and rotation angle, that is, the stroke of the brake pedal increases or when the braking required while a vehicle increases, and a second channel signal of which the duty linearly increases from the minimum duty to the maximum duty in the same situation. The duty is a ratio showing a high state in a pulse signal.

Furthermore, as shown in FIG. 5, the maximum duty and the minimum duty may show a mutually complementary relationship with 50% duty therebetween. That is, the magnitude between the maximum duty and 50% duty and the magnitude between the minimum duty and 50% duty may be made same. Accordingly, the first channel signal CH1 and the second channel signal CH2 also have a mutually complementary relationship with 50% duty therebetween. The braking controller B or the regenerative braking controller R each generate first ON/OFF signals BS/second ON/OFF signals BLS by comparing the first channel signal CH1 and the first reference value UR/the second channel signal CH2 and the second reference value LR. The first reference value UR and the second reference value LR are values that are determined in advance to determine that a force or braking power of a self-driving vehicle acts or the force or power is removed.

Accordingly, the brake system according to an exemplary embodiment of the present disclosure can flexibly and generally control ON/OFF of each device which is controlled by the ICU when a braking force increases, using such signals in two directions or a signal having mutual complementariness of 50% of the signals. That is, even though the ON/OFF directionalities from On into OFF or from OFF into ON of the devices that are controlled by the ICU are different, the brake system according to an exemplary embodiment of the present disclosure performs flexible and unified control by generating the first channel signal CH1 and the second channel signal having a mutually complementary relationship with 50% duty therebetween from a switch-off signal for going into OFF from On and a switch-on signal for going into ON from OFF.

FIG. 6 is a diagram showing another example of ON/OFF signals that are generated by a brake system according to an exemplary embodiment of the present disclosure. The first controller including the braking controller B and the regenerative braking controller R can generate first ON/OFF signals BS, which transit from a high state into a low state, based on the result of comparing the first channel signal CH1 and the first reference value UR with each other, and can generate second ON/OFF signals BLS by inversing the first ON/OFF signals BS. As another example of the present disclosure, the braking controller B and the regenerative braking controller R can generate second ON/OFF signals BLS, which transit from a low state into a high state, based on the result of comparing the second channel signal CH2 and the second reference value LR with each other, and can generate first ON/OFF signals BS by inversing the second ON/OFF signals. That is, in the present exemplary embodiment of the present disclosure, an inverse signal is generated from a one-directional signal or an inverse-directional signal.

FIG. 6 shows that second ON/OFF signals BLS are generated by inversing first ON/OFF signals in a brake system according to an exemplary embodiment of the present disclosure. In the graph shown in FIG. 6, the horizontal axis is time and the vertical axis is output voltage. The braking controller B or the regenerative braking controller R compares a first channel signal, which is output from the stroke detector SS or the self-driving controller C, and a first reference value UR with each other and generates one first ON/OFF signal BS that shows a high state when the first channel signal CH1 is greater than the first reference value UR and shows a low state when the first channel signal CH1 is smaller than or the same as the first reference value UR. An inverse logic element, etc. generate another one second ON/OFF signal BLS by inversing the generated first ON/OFF signal BS. Similarly, the inverse logic element, etc. generate another one first ON/OFF signal by generating an inverse signal of the second ON/OFF signal BLS.

Accordingly, it is possible to generate two ON/OFF signals using only one reference value in the exemplary embodiment shown in FIG. 6. Therefore, the brake system according to an exemplary embodiment of the present disclosure can perform more efficient control in terms of cost. Furthermore, the period in which the state of the two ON/OFF signals BS and BLS transit from a high state to a low state or from a low state to a high state may be substantially very short (for example, 10 ms or less), but delay, etc. are generated in the circuit operation in the present period. Therefore, the brake system according to an exemplary embodiment of the present disclosure can perform quick control by preventing such delay.

The first reference value UR and the second reference value LR are values that are determined in advance to determine that a force or braking power of a self-driving vehicle acts or the force or power is removed. Accordingly, the first reference value UR and the second reference value LR may be determined based on the magnitude of a stroke. For example, to generate ON/OFF signals even if a small force is applied to depress the brake pedal, the predetermined reference value may be set so that the minimum duty shown in FIG. 6 as duty corresponding to a smaller stroke. Accordingly, the brake system according to an exemplary embodiment of the present disclosure enables optimal control suitable for the characteristic of the brake lamp L which is controlled by the ICU.

The brake system according to an exemplary embodiment of the present disclosure is an automotive brake system, in detail, a brake system that reduces a cost by removing an existing brake pedal-based brake lamp switch, that prevents non-turning-on of a brake lamp due to breakage or malfunction of an MUC included in an ICU, and that secures safety of a vehicle and users.

Existing brake systems cannot turn on a brake lamp L when an MCU breaks or abnormally operates and braking is performed independently from a brake lamp switch like in a situation in which regenerative braking is performed by a regenerative braking controller R or self-driving braking is performed by a self-driving controller C. Furthermore, the existing brake systems may cause a malfunction or paralysis even when controlling the brake lamp L, depending on whether a brake pedal is operated.

In the existing brake system, a stroke detector SS is a detector which is provided on a hinge shaft of the brake pedal, etc., detects a stroke when a driver operates the brake pedal, that is, displacement or a rotation angle of the brake pedal, and outputs a detection signal. A brake lamp switch generates ON/OFF signals that inform a user, and drivers or pedestrians around the vehicle of whether the brake pedal is operated. Furthermore, the existing brake systems transmit a signal to an ICU that controls whether to operate a brake lamp L through a brake lamp switch. Accordingly, the existing brake systems employ a technology of facilitating a brake lamp switch L to transmit by itself a control signal to a switch S included in an ICU controller when the MCU M included in the ICU controller breaks or abnormally operates.

The existing brake systems cannot turn on a brake lamp when an MCU breaks or abnormally operates and braking is performed independently from a brake lamp switch like in a situation in which regenerative braking is performed by a regenerative braking controller R or self-driving braking is performed by a self-driving controller C. Furthermore, the existing brake systems may cause a malfunction or paralysis even when controlling peripheral devices of a brake such as a start controller, an engine control unit, a shift control unit, and a vehicle control unit, depending on whether the brake pedal is operated.

Accordingly, the brake system according to an exemplary embodiment of the present disclosure can prevent an uncontrollable state of a brake lamp due to breakage or abnormal operation of an MCU M. Therefore, safety of a vehicle and users is secured. The brake lamp switch is a hardware switch which is separately mounted in a vehicle, so price competitiveness of a vehicle is increased in the exemplary embodiment of the present disclosure. In the exemplary embodiment of the present disclosure, it is possible to remove a quality problem due to breakage of the brake lamp switch, so that the quality of a vehicle is also improved.

The ICU included in the second controller may include a brake lamp controller that is configured to control turning-ON/OFF of a brake lamp by recognizing a detection signal. The ICU may include a start controller that is configured to control start of a vehicle so that the vehicle may be started only when the brake pedal is operated by recognizing a detection signal. The ICU may include an engine control unit that turns off cruise control of a vehicle and controls ISG (Idle Stop and Go) of a vehicle by detecting a detection signal. The ICU may include a shift control unit that releases shift-lock of a transmission by recognizing a detection signal. Finally, the ICU may include a vehicle control unit that integrates the functions of the engine control unit and the shift control unit. However, an internal combustion engine or a hybrid vehicle that has an engine may be provided with an ICU including an engine control unit and a shift control unit, and an electric vehicle that generates power using an electric motor without an engine may be provided with an ICU including a vehicle control unit.

Whether to decelerate a vehicle which is being driven may be determined when the gradient of a road changes, when the distance between the vehicle and objects including forward/rearward vehicles, a pedestrian, and an obstacle increases or decreases, and when the speed of a forward/rearward object increases or decreases. The brake system of the exemplary embodiment is an automotive brake system including a braking device according to operation of a brake device provided on a wheel of a vehicle that brakes the vehicle with a loss of thermal energy, and a braking device according to operation of a regenerative braking device that brakes a vehicle through conversion of electrical energy. In the instant case, in the braking type according to operation of a brake device provided on a wheel of a vehicle, a wheel brake includes a friction brake using friction, an engine brake using engine friction and heat generated by air compression, a magnetic brake using a thermal loss of a vortex current induced by a magnetism due to a motion, and a power generation brake using a thermal loss of a load connected to a voltage induced by a motion.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A brake system comprising:
a stroke detector configured to detect a stroke of a brake pedal and to output a signal;
a first controller configured to generate an ON signal or an OFF signal for a brake lamp according to a result of comparing the signal from the stroke detector with a predetermined reference value; and
a second controller including a switch configured to receive the ON signal or the OFF signal and to control ON or OFF of the brake lamp,
wherein the first controller includes a pedal controller disposed in an electronic brake pedal and a braking controller configured to control a brake device provided on a wheel of a vehicle,
wherein the braking controller is directly connected to the switch,
wherein the pedal controller is configured to transmit the signal from the stroke detector to the braking controller,
wherein the braking controller is configured to generate an ON signal or an OFF signal based on the signal transmitted from the stroke detector,
wherein the signal from the stroke detector includes a first channel signal of which duty linearly decreases from a maximum duty to a minimum duty when the stroke of the brake pedal increases and a second channel signal of which duty linearly increases from the minimum duty to the maximum duty when the stroke of the brake pedal increases,
wherein the first channel signal and the second channel signal have a mutually complementary relationship with 50% duty therebetween, wherein the predetermined reference value includes a first reference value and a second reference value that have a mutually complementary relationship with 50% duty therebetween,
wherein the first controller is configured to generate first ON/OFF signals that transit into a low state from a high state according to a result of comparing the first channel signal and the first reference value with each other, and to generate second ON/OFF signals that transit into the high state from the low state according to a result of comparing the second channel signal and the second reference value with each other, and
wherein the ON/OFF signals correspond to the first ON/OFF signals or the second ON/OFF signals.

2. The brake system of claim 1, wherein the first controller further includes a regenerative braking controller and the regenerative braking controller is directly connected to the switch.

3. A brake system comprising:
a stroke detector configured to detect a stroke of a brake pedal and to output a signal;
a first controller configured to generate an ON signal or an OFF signal for a brake lamp according to a result of comparing the signal from the stroke detector with a predetermined reference value; and
a second controller including a switch configured to receive the ON signal or the OFF signal and to control ON or OFF of the brake lamp,
wherein the first controller includes a pedal controller disposed in an electronic brake pedal and a braking controller configured to control a brake device provided on a wheel of a vehicle,
wherein the pedal controller is configured to transmit the signal from the stroke detector to the braking controller,
wherein the braking controller is configured to generate the ON signal or the OFF signal based on the signal transmitted from the stroke detector,
wherein the braking controller is directly connected to the switch,
wherein the signal from the stroke detector includes a first channel signal of which duty linearly decreases from a maximum duty to a minimum duty when the stroke of the brake pedal increases and a second channel signal of which duty linearly increases from the minimum duty to the maximum duty when the stroke of the brake pedal increases, wherein the first channel signal and the second channel signal have a mutually complementary relationship with 50% duty therebetween, wherein the predetermined reference value includes a first reference value and a second reference value that have a mutually complementary relationship with 50% duty therebetween, wherein the first controller is configured to generate first ON/OFF signals that transit into a low state from a high state according to a result of comparing the first channel signal and the first reference value with each other, and to generate second ON/OFF signals that transit into the high state from the low state according to a result of comparing the second channel signal and the second reference value with each other, and wherein the ON/OFF signals correspond to the first ON/OFF signals or the second ON/OFF signals.

4. A brake system comprising:

a stroke detector configured to detect a stroke of a brake pedal and to output a signal;

a first controller configured to generate an ON signal or an OFF signal for a brake lamp according to a result of comparing the signal from the stroke detector with a predetermined reference value; and a second controller including a switch configured to receive the ON signal or the OFF signal and to control ON or OFF of the brake lamp, wherein the first controller includes a pedal controller disposed in an electronic brake pedal and a braking controller configured to control a brake device provided on a wheel of the vehicle, and wherein the pedal controller is configured to generate the ON signal or the OFF signal and is directly connected to the switch, wherein the pedal controller is configured to transmit the signal from the stroke detector to the braking controller, wherein the braking controller is configured to generate an ON signal or an OFF signal based on the signal transmitted from the stroke detector, and wherein the braking controller is directly connected to the switch;

wherein the signal from the stroke detector includes a first channel signal of which duty linearly decreases from a maximum duty to a minimum duty when the stroke of the brake pedal increases and a second channel signal of which duty linearly increases from the minimum duty to the maximum duty when the stroke of the brake pedal increases, wherein the first channel signal and the second channel signal have a mutually complementary relationship with 50% duty therebetween, wherein the predetermined reference value includes a first reference value and a second reference value that have a mutually complementary relationship with 50% duty therebetween, wherein the first controller is configured to generate first ON/OFF signals that transit into a low state from a high state according to a result of comparing the first channel signal and the first reference value with each other, and to generate second ON/OFF signals that transit into the high state from the low state according to a result of comparing the second channel signal and the second reference value with each other, and wherein the ON/OFF signals correspond to the first ON/OFF signals or the second ON/OFF signals.

5. A brake system comprising:

a stroke detector configured to detect a stroke of a brake pedal and to output a first detection signal;

a self-driving controller configured to output a second detection signal for giving an instruction of deceleration by determining whether a vehicle is decelerated while being driven;

a first controller configured to generate an ON signal or an OFF signal for a brake lamp according to the first detection signal and the second detection signal and control a brake device provided on a wheel of the vehicle; and a second controller including a switch configured to receive the ON signal or the OFF signal and to control ON or OFF of the brake lamp, wherein the first controller and the switch are directly connected to each other, wherein the first controller includes a pedal controller disposed in an electronic brake pedal and a braking controller configured to control the brake device provided on the wheel of the vehicle, wherein the pedal controller is configured to transmit the first detection signal from the stroke detector to the braking controller, wherein the braking controller is configured to generate an ON signal or an OFF signal based on the first detection signal transmitted from the stroke detector, and wherein the braking controller is directly connected to the switch;

wherein the first detection signal from the stroke detector or the second detection signal from the self-driving controller includes a first channel signal of which duty linearly decreases from a maximum duty to a minimum duty when the stroke of the brake pedal or braking power required by the self-driving controller increases and a second channel signal of which duty linearly increases from the minimum duty to the maximum duty when the stroke of the brake pedal or braking power required by the self-driving controller increases, wherein the first channel signal and the second channel signal have a mutually complementary relationship with 50% duty therebetween, wherein a predetermined reference value includes a first reference value and a second reference value that have a mutually complementary relationship with 50% duty therebetween, wherein the first controller is configured to generate first ON/OFF signals that transit into a low state from a high state according to a result of comparing the first channel signal and the first reference value with each other, and to generate second ON/OFF signals that transit into the high state from the low state according to a result of comparing the second channel signal and the second reference value with each other, and wherein the ON/OFF signals correspond to the first ON/OFF signals or the second ON/OFF signals.

6. The brake system of claim 5, wherein the first controller further includes a regenerative braking controller and the regenerative braking controller is directly connected to the switch.

7. A brake system comprising:

a stroke detector configured to detect a stroke of a brake pedal and to output a signal;

a first controller configured to generate an ON signal or an OFF signal for a brake lamp according to the signal and control a brake device provided on a wheel of the vehicle;

wherein the first controller includes a pedal controller and a braking controller, wherein the pedal controller is configured to transmit the signal from the stroke detector to the braking controller, the braking controller configured to generate an ON signal or an OFF signal for a brake lamp according to a result of comparing the signal from the stroke detector with a predetermined reference value and to control a brake device provided on a wheel of a vehicle;

the pedal controller disposed in an electronic brake pedal, connected to the braking controller through Control unit Area Network (CAN), and configured to generate the ON signal or the OFF signal for the brake lamp according to the result of comparing the signal from the stroke detector disposed in the electronic brake pedal with the predetermined reference value; and an Integrated Central Control Unit (ICU) including a switch configured to receive the ON signal or the OFF signal and control ON or OFF of the brake lamp, wherein the braking controller and the pedal controller are directly connected to the switch, wherein the signal from the stroke detector includes a first channel signal of which duty linearly decreases from a maximum duty to a minimum duty when the stroke of the brake pedal increases and a second channel signal of which duty linearly increases from the minimum duty to the maximum duty when the stroke of the brake pedal increases, wherein the first channel signal and the second channel signal have a mutually complementary relationship with 50% duty therebetween, wherein the predetermined reference value includes a first reference value and a second reference value that have a mutually complementary relationship with 50% duty therebetween, wherein the stroke detector is configured to generate first ON/OFF signals that transit into a low state from a high state according to a result of comparing the first channel signal and the first reference value with each other, and to generate second ON/OFF signals that transit into the high state from the low state according to a result of comparing the second channel signal and the second reference value with each other, and wherein the ON/OFF signals correspond to the first ON/OFF signals or the second ON/OFF signals.

* * * * *